United States Patent [19]

Bustos et al.

[11] Patent Number: 4,708,552

[45] Date of Patent: Nov. 24, 1987

[54] EXPANSIBLE MOUNTING ASSEMBLY

[75] Inventors: Rafael T. Bustos, Alpharetta; William B. Taylor, Chamblee, both of Ga.

[73] Assignee: Clairson International, Ocala, Fla.

[21] Appl. No.: 649,818

[22] Filed: Sep. 12, 1984

[51] Int. Cl.⁴ ............................................. F16B 13/06
[52] U.S. Cl. ........................................ 411/60; 411/42; 411/448; 248/231.91
[58] Field of Search .................. 411/42, 29, 30, 31, 411/39, 40, 41, 42, 44, 45, 57, 60, 386, 387, 448, 450; 248/489, 493, 217.3, 231.91

[56] References Cited

U.S. PATENT DOCUMENTS

| | | |
|---|---|---|
| Re. 13,204 | 2/1911 | Jossart . |
| 646,164 | 3/1900 | Cathrein .................. 411/42 |
| 938,875 | 11/1909 | Kobert . |
| 998,781 | 7/1911 | Kobert . |
| 1,099,668 | 6/1914 | Rosenberg ............... 411/42 |
| 1,138,219 | 5/1915 | Hottenroth . |
| 3,094,892 | 6/1963 | Topf ........................ 411/42 |
| 3,226,065 | 12/1965 | Smith ...................... 248/493 |
| 3,461,772 | 8/1969 | Barry ....................... 411/60 |
| 3,691,924 | 9/1972 | Baker . |
| 3,765,295 | 10/1973 | Ptak . |
| 3,861,631 | 1/1975 | Shorin .................. 248/489 X |
| 3,991,963 | 11/1976 | Solo . |
| 4,050,344 | 9/1977 | Dorgnon . |
| 4,094,490 | 6/1978 | Einhorn .................. 248/489 |
| 4,287,807 | 9/1981 | Pacharis .................. 411/42 |
| 4,488,843 | 12/1984 | Achille .................. 411/60 X |

FOREIGN PATENT DOCUMENTS

| | | | |
|---|---|---|---|
| 1566814 | 3/1969 | France .................. 411/44 |
| 1205876 | 9/1970 | United Kingdom . |

Primary Examiner—Neill Wilson
Attorney, Agent, or Firm—Cushman, Darby & Cushman

[57] ABSTRACT

A mounting assembly for mounting an object to a plasterboard wall includes a molded plastic bracket formed with a hollow barrel at one end and a clip at the other end to support an object. An anchor having a pointed stem portion and a head at the other end, is inserted through the hollow barrel of the bracket and then drive into the plasterboard. The anchor includes an axial bore extending from the head end along part of the stem portion and a through slot extends from the axial bore toward the pointed end thereby defining two opposed stem sections. Inwardly extending projections on each stem section cooperate with a nail to expand the two opposed stem sections and to snap those sections apart adjacent the pointed end. Mating keyways formed on the anchor keys formed on the hollow barrel orient the stem sections one vertically above the other when the anchor is in place within the wall.

12 Claims, 5 Drawing Figures

EXPANSIBLE MOUNTING ASSEMBLY

BACKGROUND OF THE INVENTION

This invention relates to mounting devices, and, more particularly, to an improved mounting assembly for securing objects to vertical supports such as a wall.

Expansible sleeves or anchors are used in a variety of applications to secure an object in place on a given surface. Expansible anchors generally include a sleeve, often formed with threads or projections along its outer surface, which is adapted to be inserted within a bore formed in the surface to which an object is to be mounted. An axial bore is formed in the sleeve which is adapted to receive a pin of greater diameter so that when the pin is inserted into the bore the walls of the sleeve are urged apart or expanded to wedge the sleeve into position within the bore formed in the mounting surface.

One limitation of such prior art expansible anchors is that a hole must first be drilled in the mounting surface to receive the sleeve. This increases the difficulty in mounting objects to relatively soft, easily breakable surfaces such as the plaster or plaster board walls of a building. If the hole in the plasterboard is made too large, the sleeve may become loosened or pulled out of the wall under the application of downward loading.

To avoid the step of first boring a hole in a surface such as plaster or plaster board, self-drilling anchor shields or sleeves have been developed such as disclosed, for example, in U.S. Pat. No. 4,050,344. Anchor sleeves of this general type comprise a hollow nail-like plug or sleeve having a body formed with a point at one end and a striking surface or head section at the other end. An axial bore is formed part way along the body, and radial slots extend along the body to separate it into two or more body portions. To secure the anchor sleeve to a mounting surface, the pointed end of the sleeve is first driven into the mounting surface by striking the head section of the sleeve with a tool such as a hammer. A pin is then inserted through the axial bore and between the body portions to urge them apart and into engagement with the mounting surface.

While anchors of this type avoid the separate operation of first forming a bore in the mounting surface, their effectiveness in supporting the weight of a heavy object on a breakable surface such as plaster or plaster board is limited by at least two factors. First, expansion of the body portions of the sleeve within the mounting surface is limited to the diameter of the pin inserted within the sleeve. As the pin is inserted between the body portions of the sleeve the body portions are urged apart, but no further apart than the outside diameter of the pin. In addition, there is no assurance that prior art anchor sleeves will be oriented within the mounting surface so that the body portions expand in the same direction as the vertical force tending to pull the sleeve out of the wall or other surface. It can be appreciated that the load carrying capability of any anchor sleeve is maximized when the body portions of the sleeve or plug are expanded in a vertical direction within the mounting surface, or parallel to the direction in which the load is applied to the sleeve. The load tends to urge the body portions directly into the mounting surface, instead of outwardly from the mounting surface as could occur if the body portions were expanded along an axis disposed at an angle to the axis of the applied load. In prior art anchor sleeves, proper positioning of the plug is entirely dependent on the skill of the individual installing it and there is no fail-safe feature to assure that the body portions of the sleeve are oriented parallel to the vertical axis in which the load is applied by an object to be mounted.

SUMMARY OF THE INVENTION

It is therefore an object of this invention to provide a mounting assembly for securing objects to vertical support surfaces such as walls in which expansible sections formed in a nail-like anchor or shield are adapted to be urged a maximum distance apart within the wall and are automatically oriented so that one expansible section is disposed vertically above the other in the direction of application of a vertical load to the mounting assembly.

The mounting assembly herein which accomplishes that objective comprises a molded plastic bracket formed with an angled hollow barrel at one end and a clip at the other end which is adapted to engage the object to be mounted. The bracket is placed flush against the vertical support, such as a plaster or plaster board wall of a building, for mounting thereto. An anchor or shield, having a stem portion formed with a point at one end and a striking surface or head section at the other end, is adapted to be inserted through the hollow barrel so that the pointed end engages the vertical support. The shield is then pounded or hammered into the vertical support surface by striking the head section so as to mount the bracket in place. The stem portion of the shield is formed with an axial bore extending from the head section along part of its length. A through slot extends between the axial bore and the pointed end of the stem portion to divide the stem portion into two opposed stem sections. Means are provided for orienting the stem portion of the shield within the barrel so that one of the stem sections is automatically disposed vertically above the other in the direction of a vertical load applied to the mounting assembly by the object to be supported. A pin is adapted to be inserted through the axial bore of the stem portion and between the stem sections. Camming means are formed on each of the stem sections and extend inwardly within the through slot to contact the pin and thus urge the stem sections apart at least a distance greater than the diameter of the pin and into secure engagement with the vertical support. Preferably, the stem portion splits apart near its pointed end so that the stem sections detach from one another and extend a substantial distance outwardly into the wall.

The means for orienting the shield within the barrel comprises at least one key formed in the interior wall of the barrel and a mating keyway formed in the exterior surface of the shield. The keyway of the shield engages the key in the barrel as the shield is inserted therethrough so that the stem sections are oriented one above the other in the direction of the vertical load applied to the bracket by the object to be mounted.

The camming means comprises a projection formed on each of the stem sections. The projections extend within the through slot from one stem section to the opposite stem section. The projections are adapted to contact the pin as it is inserted between the stem sections so as to maximize the expansion or movement of the stem section apart and thereby provide improved engagement with the vertical support.

The mounting assembly of this invention eliminates the need for forming a separate bore in the support surface by providing a shield which may be driven into the support surface like a nail. In addition, two features of this invention enable the mounting assembly to provide improved resistance to being pulled out of the vertical support under the weight of an object to be supported. First, a key arrangement between the shield and barrel assures that the stem sections of the shield are automatically properly oriented so that they are expanded within the vertical support in the direction of the vertical load being applied by the object supported on the bracket. In addition, expansion of the stem sections within the vertical support is maximized by the projections mounted on each stem section within the through slot which engage the pin. The stem sections are thus urged apart a distance at least greater than the diameter of the pin and preferably become detached from one another at the pointed end of the stem portion to move outwardly a substantial distance within the wall. These improvements allow the mounting assembly of this invention to carry more vertical load without being pulled from the vertical support than in prior art anchoring devices.

DESCRIPTION OF THE DRAWINGS

The structure, operation and advantages of this invention will become further apparent upon consideration of the following description taken in conjunction with the accompanying drawings, wherein.

DETAILED DESCRIPTION OF THE INVENTION

Figure 1:
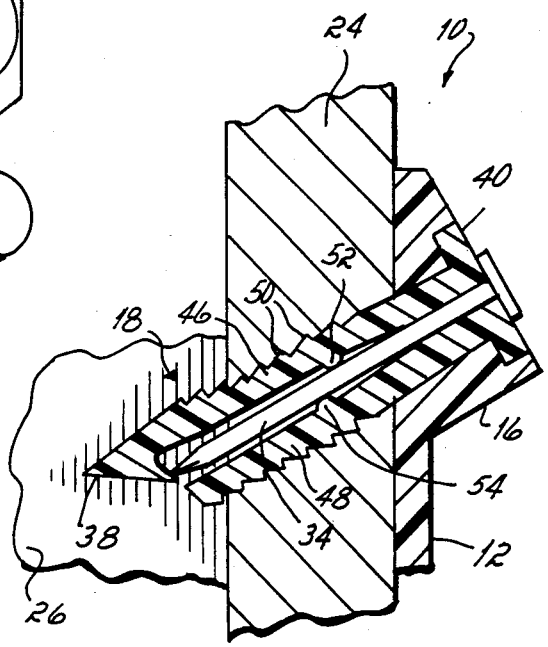
FIG. 1 is an exploded, perspective view of the mounting bracket and shield of this invention.

The mounting assembly 10 of this invention includes a bracket 12 formed of molded plastic or a similar material having a hook or clip 14 at one end for supporting an object such as a painting (not shown), and a hollow barrel 16 at the other end. The bracket 12 has a flat rear surface 20 which is adapted to be placed flush against a vertical support such as a wall 22 formed of a sheet 24 of wallboard attached to a stud 26. Preferably, the hollow barrel 16 is angled downwardly relative to the rear surface 20 of bracket 12 in the direction of the vertical load applied by an object supported on clip 14. A shown in FIGS. 1 and 4, the inner wall 17 of barrel 16 is formed with a pair of keys 28, 29 which are spaced approximately 180° apart and extend from the shoulder 30 of a recess formed in the barrel 16 to the opposite end of barrel 16. The shoulder 30 extends a short distance inwardly from the outside edge of the barrel 16 forming a lip 32.

Figure 5:
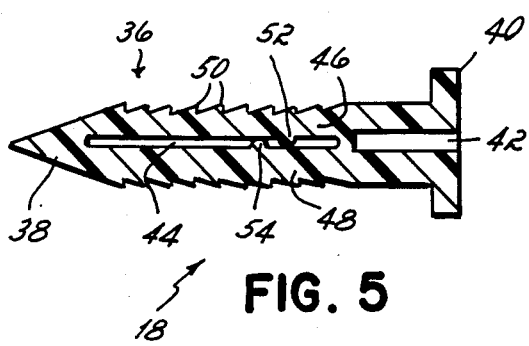
FIG. 5 is a side view in partial cross section of the shield of this invention.

The bracket 12 is securely mounted to the wall 22 by the combination of a shield or anchor 18 and nail 34. Referring to FIGS. 1 and 5, the anchor 18 comprises a stem portion 36 having a pointed end 38 and a head 40 formed at the opposite end. An axial bore 42 is formed in the stem portion 36, which extends from the head 40 toward the pointed end 38 along approximately one third of the length of stem portion 36. A through slot 44 is formed through the center of stem portion 36 and extends along its length between the end of axial bore 42 and the pointed end 38. Preferably, the through slot 44 extends along approximately two thirds of the length of stem portion 36 and divides it into two opposed stem sections 46 and 48. The exterior surface of stem portion 36, along substantially the entire length of stem sections 46, 48, is formed with circumferential ridges or flanges 50 which are shaped like the barbs of a fish hook.

Figure 3:
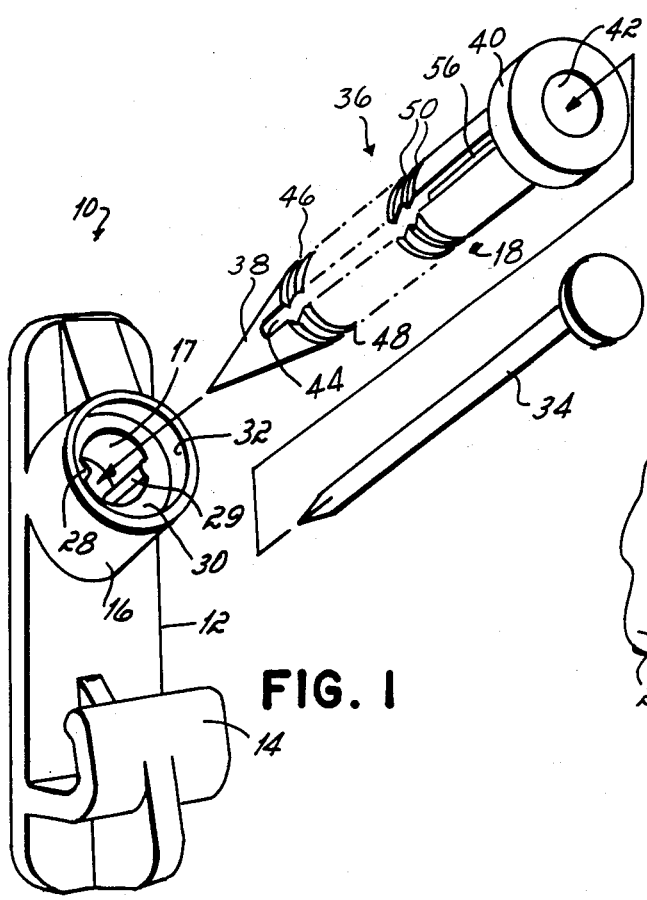
FIG. 3 is a side view in partial cross-section of the completely installed mounting assembly herein with the stem sections expanded.
Figure 4:
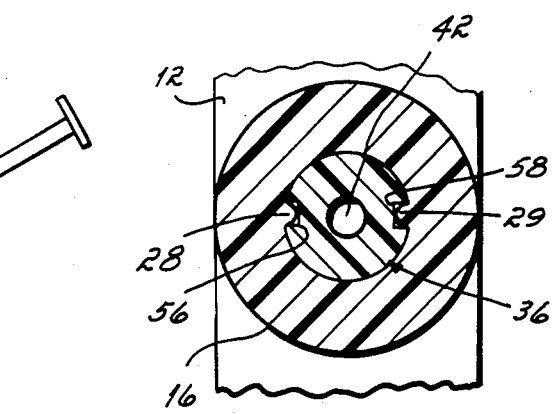
FIG. 4 is a cross-sectional view taken generally along line 4—4 of FIG. 2.

As shown in FIGS. 3-5, rounded projections 52, 54 are formed on the interior of stem sections 46, 48, respectively. The projection 52 extends from stem section 46 within the slot 44 and preferably contacts the opposite stem section 48. Similarly, the projection 54 extends from stem section 48 into contact with the opposite stem section 46.

Figure 2:
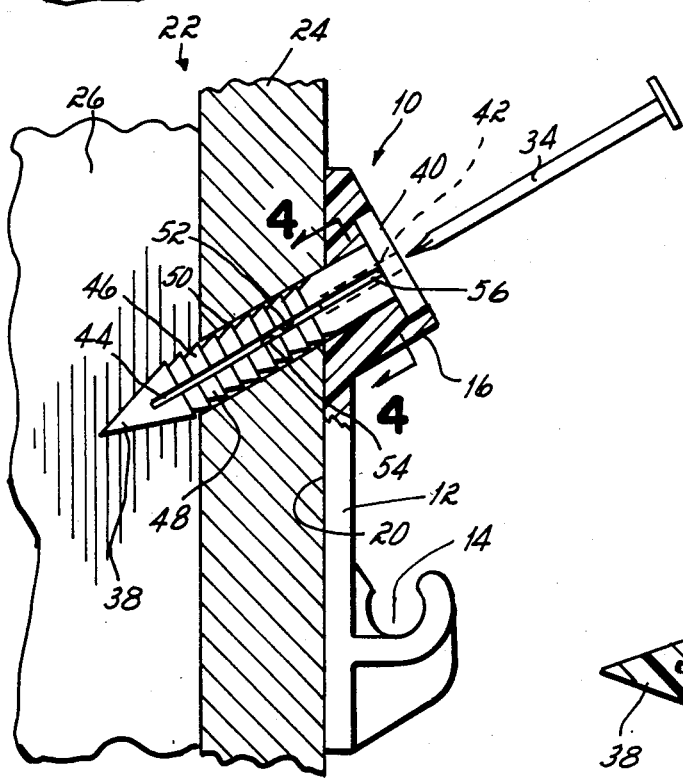
FIG. 2 is a side view in partial cross-section of the bracket and shield positioned on a vertical support just prior to insertion of the pin.

The exterior surface of anchor 18 is formed with a pair of grooves or keyways 56, 58 which are spaced approximately 180° part. The keyways 56, 58 extend from the head 40 of stem portion 36 to the through slot 44 which acts as an extension of the keyways 56, 58 along substantially the entire length of stem portion 36 as shown in FIGS. 1 and 2. As discussed below, the keyways 56, 58 are adapted to mate with the keys 28, 29 formed in the inner wall 17 of hollow barrel 16.

The advantages provided by the mounting assembly 10 of this invention are best illustrated with reference to a discussion of its installation in wall 22. Initially, the rear surface 20 of bracket 12 is placed flush against the wall 22 so that the clip 14 faces upwardly in a position to support an object to be mounted on the wall 22. The anchor 18 is then inserted through the hollow barrel 16 so that its pointed end 38 contacts the sheet 24 of wall 22. In order to insert the anchor 18 within the barrel 16, the keyways 56, 58 formed in the anchor 18 must be aligned so as to mate with the keys 28, 29 formed in the inner wall 17 of barrel 16. As shown in FIGS. 2 and 3, the keyways 56, 58 and keys 28, 29 are positioned so that when the anchor 18 is inserted within the barrel 16 one of the stem sections 46, 48 is vertically above the other. This orientation of stem sections 46, 48 is the only way in which the anchor 18 will fit within barrel 16. With the anchor 18 in position in barrel 16, a hammer or other tool is used to strike the head 40 of shield 18 to drive it into place within the sheet 24 of wall 22. Since the barrel 16 is angled downwardly relative to the wall 22, the anchor 18 extends into the wall 22 at a downward angle to better support the vertical forces applied by objects mounted to the clip 14 of bracket 12. When anchor 18 is fully seated in place, the head 40 engages the shoulder 30 within barrel 16 and extends within the lip 32 so that the head 40 is flush with the outer edge of barrel 16.

The next step in the installation procedure is the insertion of a nail or pin 34 into the anchor 18. Preferably, the pin 34 is formed of steel and has an outside diameter at least equal to the width of through slot 44. Referring to FIGS. 2 and 3, the pin 34 first enters the axial bore 42 in the head 40 of stem portion 36 and is then driven within through slot 44 and between the stem sections 46, 48. Since the outside diameter of the pin 34 is at least equal to the width of through slot 44, the stem sections 46, 48 are initially urged apart as the pin 34 enters through slot 44. In accordance with an important feature of this invention, the movement of stem sections 46, 48 is maximized because of the addition of projections 52, 54 to the through slot 44. As the pin 34 continues its axial movement within through slot 44, it contacts the projections 52, 54 mounted to stem sections 46, 48 respectively. The projections 52, 54 have arcuate surfaces which act as camming surfaces upon contacting the pin 34 to urge the stem sections 46, 48 apart. As shown in FIG. 3, the stem sections 46, 48 are urged apart to such an extent that they snap apart near the pointed end 38 of stem portion 36 and separate a distance substantially greater than the diameter of pin 34. Advantageously, the upper stem section 46 moves upwardly within the wall 22 and includes the major portion of the pointed end 38 which has separated from the lower stem section 48. This aids in securing the anchor 18 within the wall 22 because it has been found that in driving the anchor 18 within the wallboard sheet 24 of wall 22, at least some of the plaster material is broken away from the sheet 24 in the area of upper stem section 46. Movement of the upper stem section 46, and a major portion of the separated pointed end 38, upwardly within wallboard 24 helps to fill in any space created by the wallboard 24 being broken away and thus resists loosening of the anchor 18.

A downward vertical force is applied to clip 14 when an object is mounted to the wall 22 which tends to pull the anchor 18 out of the wall 22. This downward force is resisted by the anchor 18 in several ways. First, the anchor 18 is initially angled downwardly when it is inserted through barrel 16 and driven into the wall 22, so that a downward vertical force tends to urge it into and downwardly within the wall 22. Secondly, the circumferential flanges 50 formed in the stem portion 36 resist movement of the anchor 18 in a direction outwardly from the wall 22. In addition, in accordance with an important aspect of this invention, the anchor 18 is oriented within the wall 22 so that the stem sections 46, 48 are urged apart along an axis parallel to the vertical force exerted by an object supported on clip 14. The vertical force thus tends to drive the stem section 48 into wall 22 to resist loosening or removal of bracket 12 from the wall 22. The key connection between the anchor 18 and hollow barrel 16 is fail-safe so that one of the stem sections 46, 48 is always disposed vertically above the other. Not only are the stem sections 46, 48 oriented vertically within wall 22, but their expansion is maximized by the projections 52, 54 as described above to further secure the anchor 18 within wall 22. All of these features of the mounting assembly 10 of this invention aid in providing a secure support for objects mounted to wall 22 which resists dislocation and at the same time does not require a separate bore to be made in wall 22 for the insertion of anchor 18.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A mounting assembly for mounting an object to a wall having an outer surface formed of plaster wallboard comprising:
   a molded plastic bracket having a hollow barrel formed therein and having means formed thereon for supporting an object from said bracket, said bracket having a flat rear surface adapted to be placed against a flat vertical surface of plaster wallboard for mounting thereto;
   a molded plastic anchor including a stem section, a head section, and a pointed end section, said head section being located at one end of said stem section, and said pointed end section being located at the opposite end of said stem section from said head section;
   an axial bore extending through said head section and through at least a portion of said stem section;
   an external peripheral surface on said said section of said anchor, said external peripheral surface having annular ribs formed thereon;
   slot means formed in said stem section of said anchor for defining two opposed stem members, said slot means extending along a major portion of the length of said stem section between a point adjacent said axial bore and a point adjacent said pointed end section, said two opposed members each having a free end adjacent said pointed end section, said anchor including means for releasably joining each of said free ends;
   said molded plastic anchor being adapted to be inserted through said hollow barrel and to be driven into the plaster wallboard located in juxtaposition to said rear surface of said bracket;
   means for orienting said stem section within said barrel; and
   an expansion pin adapted to be inserted into said axial bore and into contact with said projections to urge said two opposed stem members radially outwardly and to release said releasable joining means.

2. The mounting assembly of claim 1 in which said hollow barrel is disposed at an angle relative to said vertical support so that said anchor angles downwardly when inserted within said wallboard.

3. The mounting assembly of claim 1 in which said axial bore extends from said head section along about one-third of the length of said stem section.

4. The mounting assembly of claim 1 in which said slot means extends between said axial bore and said pointed end of said stem portion along about two-thirds of the length of said stem portion.

5. The mounting assembly of claim 1 in which said means for orienting said stem section of said anchor within said hollow barrel comprises at least one key formed on one of the outer surface of said stem section and the inner wall of said hollow barrel, and a keyway formed in the other of said outer surface of said stem section and the inner wall of said hollow barrel, said keyway being adapted to mate with said key upon insertion of said stem section of said anchor into said hollow barrel to orient said anchor therewithin to effect expansion of said stem section in a vertical plane.

6. The mounting assembly of claim 1 wherein said cam means is formed on said stem section at a location relative to said orienting means to effect expansion of said stem section in a vertical plane.

7. The mounting assembly of claim 1 in which said slot means comprises a through slot extending through the center of said stem section to said external peripheral surface, said through slot dividing said stem section into separate first and second stem sections.

8. The mounting assembly of claim 7 in which said through slot extends approximately two-thirds of the length of said stem section between said axial bore and pointed end section.

9. The mounting assembly of claim 7 in which said camming means comprises a pair of opposed projections, each of said projections being mounted to one of said first and second stem sections and extending toward the other of said first and second stem sections, said projections being adapted to contact said expansion pin to urge said first and second stem sections apart.

10. A mounting assembly for mounting an object to a wall having an outer surface formed of plaster wallboard comprising:
- a molded plastic bracket having a hollow barrel formed therein and having means formed thereon for supporting an object from said bracket, said bracket having a flat rear surface adapted to be placed against a flat vertical surface of plaster wallboard for mounting thereto;
- a molded plastic anchor including a stem section, a head section, and a pointed end section, said head section being located at one end of said stem section, and said pointed end section being located at the opposite end of said stem section from said head section;
- an axial bore extending through said head section and through at least a portion of said stem section;
- a slot means formed in said stem section, said slot means extending along a major portion of the length of said stem section between said axial bore and a point adjacent said pointed end section thereby defining two opposed stem members joined together at one end thereof adjacent said axial bore with the other ends thereof being free, said pointed end section including means for releasably joining said free ends together;
- said molded plastic anchor being adapted to be inserted through said hollow barrel and to have said pointed end driven into and beyond the plaster wallboard located in juxtaposition to said rear surface of said bracket; and
- an expansion pin adapted to be inserted into said axial bore and into said slot means stem section fractured thereby separating the two stem members adjacent said pointed end section for maximum expansion of said anchor within said plaster wallboard.

11. The mounting assembly of claim 10 in which cam means are formed on said stem section of said anchor and extend into said slot means, said cam means being adapted to contact said expansion pin upon insertion into said slot means for urging said stem section to expand rapidly outwardly.

12. The mounting assembly of claim 10 including means for orienting said stem section of said anchor within said hollow barrel so that said stem section of said anchor is expanded in a vertical plane.

* * * * *